Dec. 29, 1959    R. J. WATSON ET AL    2,918,835
TEMPLATE-GUIDED MACHINE TOOL

Filed Jan. 25, 1956    6 Sheets-Sheet 1

INVENTORS.
ROBERT J. WATSON
FRANK A. MORRIS
BY
*J. L. Bowes*
ATTORNEY

Dec. 29, 1959    R. J. WATSON ET AL    2,918,835
TEMPLATE-GUIDED MACHINE TOOL
Filed Jan. 25, 1956    6 Sheets-Sheet 2

INVENTORS.
ROBERT J. WATSON
FRANK A. MORRIS
BY
*T. L. Bowes*
ATTORNEY

Dec. 29, 1959                R. J. WATSON ET AL                2,918,835
                         TEMPLATE-GUIDED MACHINE TOOL

Filed Jan. 25, 1956                                        6 Sheets-Sheet 3

INVENTORS.
ROBERT J. WATSON
FRANK A. MORRIS
BY
*J. L. Bowes*
ATTORNEY

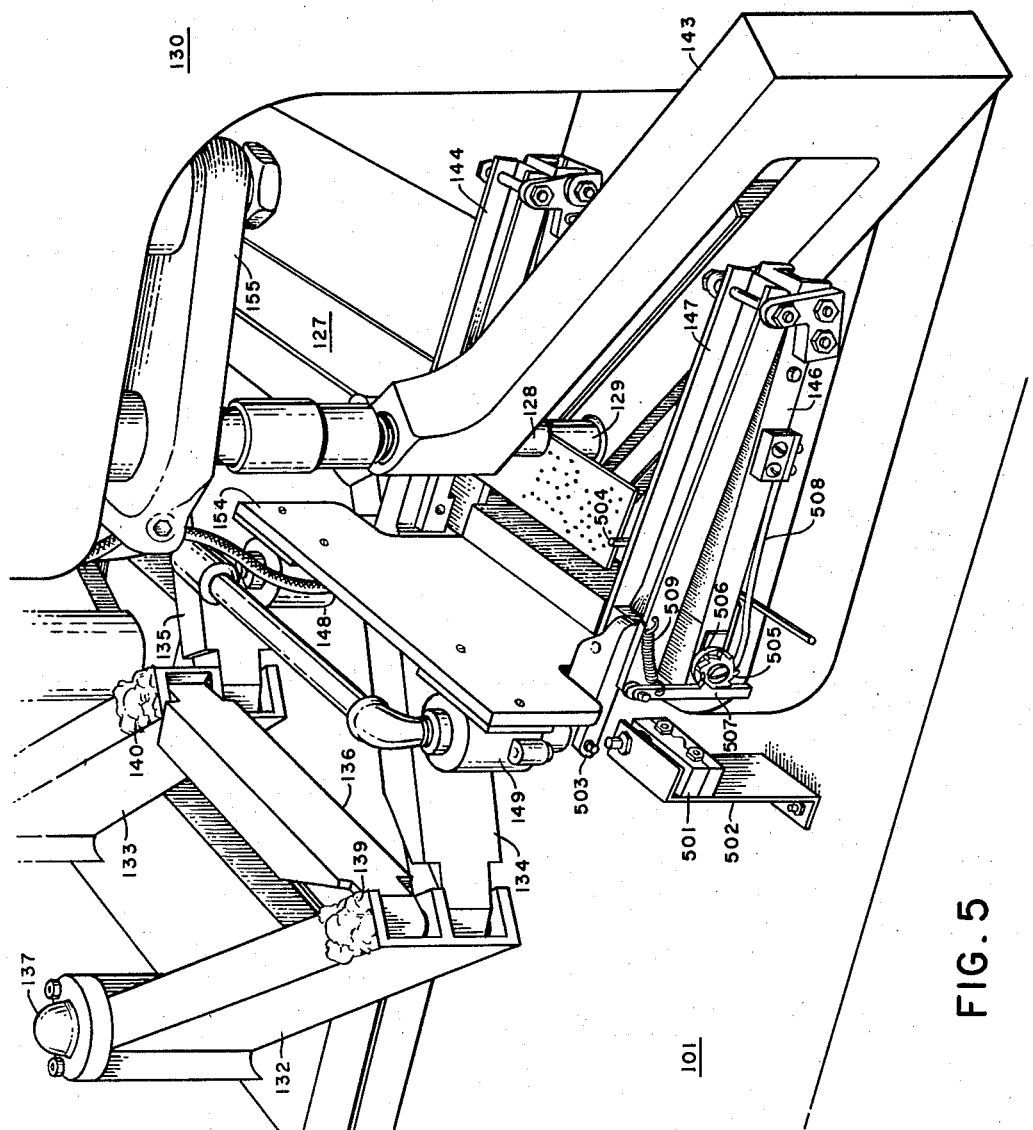

INVENTORS.
ROBERT J. WATSON
FRANK A. MORRIS

ATTORNEY

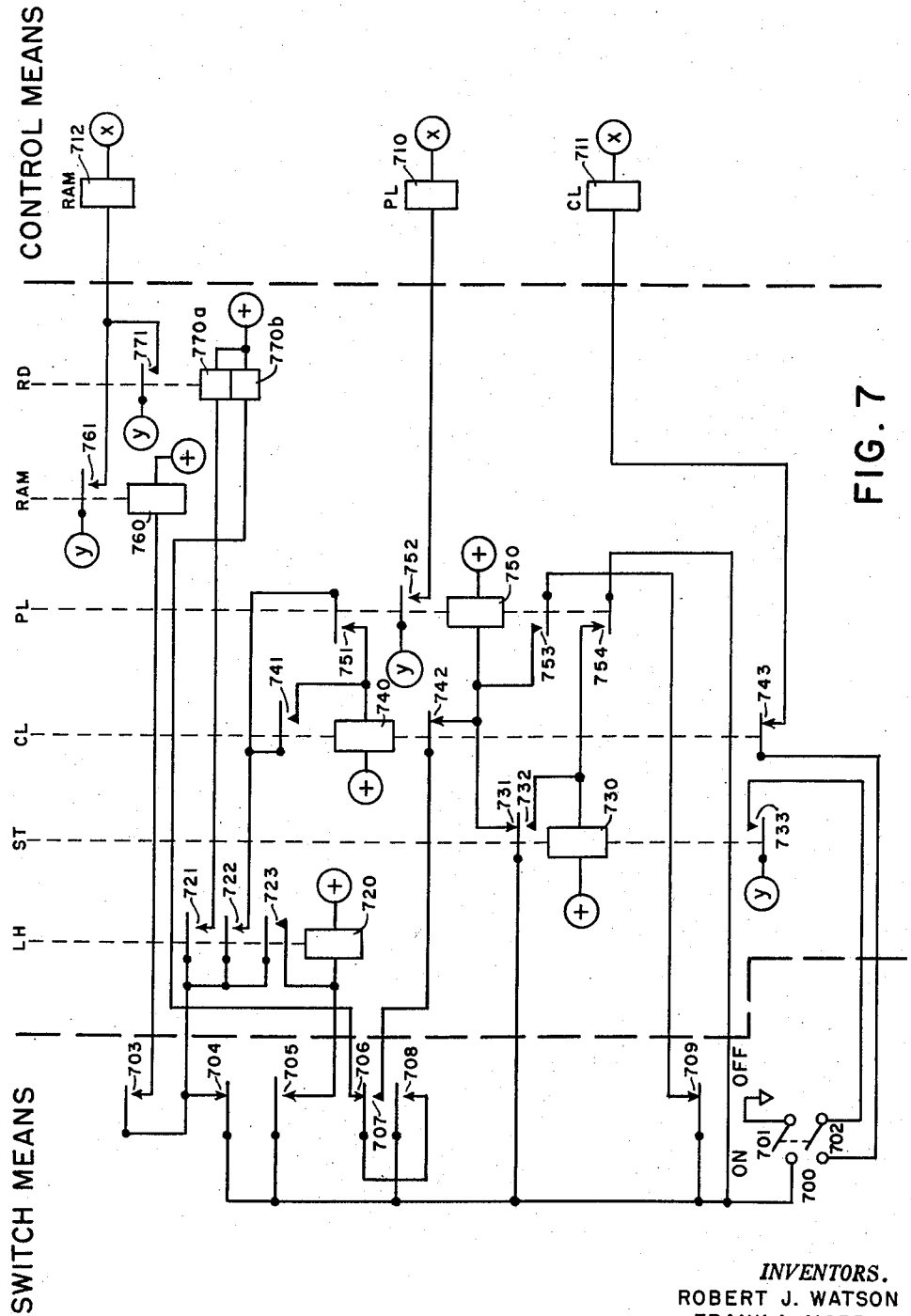

United States Patent Office

2,918,835
Patented Dec. 29, 1959

2,918,835

TEMPLATE-GUIDED MACHINE TOOL

Robert J. Watson, San Diego, Calif., and Frank A. Morris, Fishers, N.Y., assignors to General Dynamics Corporation, Rochester, N.Y., a corporation of Delaware Application January 25, 1956, Serial No. 561,192

8 Claims. (Cl. 83—71)

This invention relates to machine tools and more specifically to template-guided machine tools adapted to perform an operation at various work stations on a work piece.

Various arrangements have been known in the past for guiding machine tools by means of a template. Such machines may have a stylus which the operator guides around or over the template. The tool and work piece are moved relative to each other by mechanical or electrical means linking the tool to the stylus while the work piece remains stationary, or vice versa. An example of a machine tool of this type is a cutting torch linked to a stylus by means of a pantograph to cut pieces shaped like the template from a sheet of steel or other material.

Other template-guided machine tools make use of a template having discrete stations representing the work stations of the tool relative to the work piece. The stations on the template may be holes formed therein. When the operator moves the stylus to a position above a hole, the stylus falls or is pushed into the hole, and this action causes the machine tool to perform its operation on the work piece. Such an arrangement has been used with punch presses, as shown for example in Wiedemann Patent 2,701,017. As can readily be appreciated by those skilled in the art, however, the principle may be readily extended to other types of machine tools, such as drill presses, wherein the tool must perform a given operation at a number of locations, or work stations, on the work piece.

Unfortunately, a simple stylus-and-template arrangement has a number of drawbacks. Chief of these is the tendency of the operator to coast over a hole in the template because of the inertia of the stylus and associated linkage. This is particularly troublesome when high speed operation is sought. Furthermore, the machine tool may be actuated and accidentally brought into contact with the work piece while the work piece is moving relative to the tool, as may happen if the stylus starts to go into a template hole and is carried past by inertia.

Such difficulties have been sought to be avoided by providing the stylus with a button on top of the operator's handle which the operator presses strongly enough to push the stylus into a hole as soon as poised thereover. When the stylus enters the hole, a switch is closed, causing the tool to advance into contact with the work and perform its operation on the work piece. It is obvious that a procedure of this type is limited as to speed by the reaction time of the operator, who must observe and comprehend that the tool has completed its operation, and must then release the button and set the stylus linkage system into motion. While a procedure of this sort is acceptable where the reaction time is a small percentage of the total time for the operation, it is generally desirable to relieve the operator of the necessity for making observations and decisions. The operator is then burdened only with the duty of passing the stylus around or over the template. Where the speed of operation is high, it is virtually mandatory to eliminate the operator reaction time factor.

It is accordingly an object of my invention to provide a template-guided machine tool in which movement of the stylus from any station on the template is prevented until the tool has completed its operation on the work piece.

It is another object of my invention to provide a template guided machine tool in which the operator is relieved of responsibility for initiating the operation of the machine tool and for withdrawing the stylus from the template.

It is still another object of my invention to provide a template-guided machine tool which is simple to operate, can be operated at high speed, and is reliable in results.

Further objects and advantages of my invention will become apparent as the following description proceeds and the features of novelty which characterize my invention will be pointed out with particularity in the claims annexed to and forming a part of this specification.

In general, we accomplish the foregoing and other objects of our invention by providing an interlocking system for preventing movement of the stylus from any station on the template until the tool has completed its operation at a corresponding work station on the work piece. Furthermore, our invention permits the processing and automatic indexing of successive work pieces contained in a work strip. The work pieces are preferably integrally contained in the work strip, in which case the individual completed work pieces in the work strip can later be cut apart. To accomplish the latter function, we provide control means which hold the tool in its advanced position relative to the work when the work operation is completed at the last work station on each work piece, but release clamping means which have secured the work piece to the work piece supporting means. This allows the work piece supporting means to be moved relative to the tool while holding the work piece stationary. Upon reclamping the work piece and retracting the tool from the last hole, the stylus may be moved back to the starting position on the template to commence operation on a new work piece in the work strip.

For a better understanding of our invention, reference may be had to the accompanying drawing in which Fig. 1 is an isometric view of a preferred embodiment of our invention as applied to a perforation machine;

Fig. 5 is an isometric detail of the tool portion of the embodiment of Fig. 1;

Fig. 7 is a schematic wiring diagram of the electrical portion of the preferred embodiment of our invention.

Figure 1:
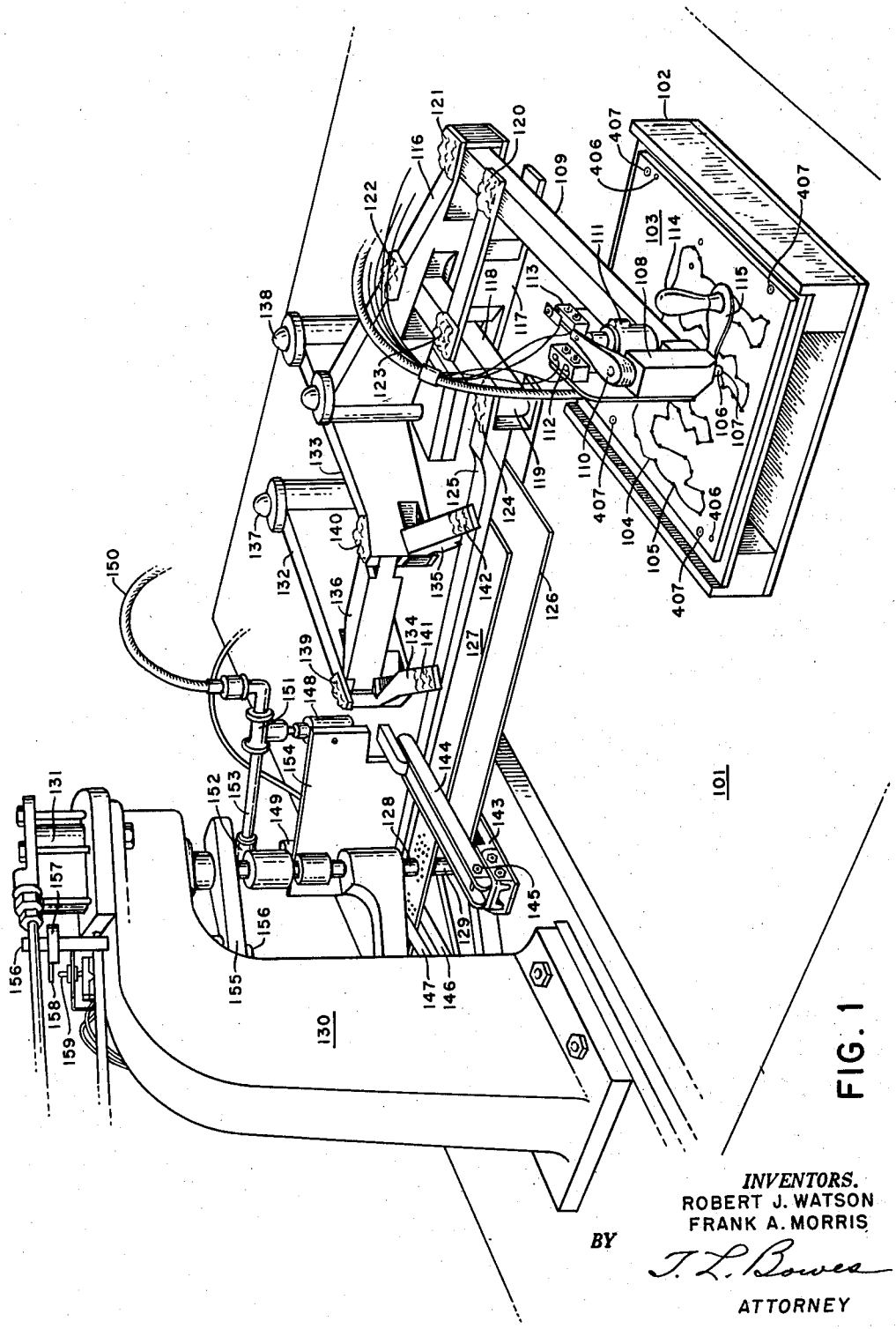

In this specification, a block of reference numerals has been reserved for each figure, with the initial digit of each reference numeral being the number of the figure to which it is assigned. Thus, reference numerals 100–199 are asigned to Fig. 1, 200–299 to Fig. 2, etc. The system enables the reader, when he sees a given reference numeral in the text, to go directly to the particular figure in the drawings where the numeral first appears.

Throughout this specification, the ground symbol is used in a general sense, i.e., to indicate a unipotential plane which may be earth, a chassis, or a common connection in any specific circuit application. It is further to be understood that the symbol (+) indicates connection to the positive terminal of a source of unidirectional current, the other terminal of which is connected to ground. Similarly, symbols $x$ and $y$ indicate connection to a suitable source of single-phase A.-C. power.

The apparatus shown in Fig. 1 may be mounted on any convenient horizontal surface 101, such as a floor, table top or work bench. Because its specific nature is immaterial to my invention, the confines of the supporting surface have been indicated only generally.

Secured to surface 101, as by any convenient means such as base 102, is a template 103. Template 103 is provided with a continuous groove 104 formed in its upper surface and having a plurality of holes such as 105 successively distributed therealong.

Poised above template 103 is a stylus 106 having a lower portion 107 (not shown in Figure 1) proportioned to ride groove 104. Stylus 106 is arranged for movement substantially at right angles to the plane of template 103, and may therefore slide vertically in housing 108. Housing 108 is supported by the forward end of arm 109.

Means are provided for retracting stylus 106 from template 103. In the illustrated embodiment, an arm 110, which is arranged to be actuated by air cylinder 111, is attached to the upper portion of stylus 106. Air cylinder 111 is arranged to raise arm 110 when air is admitted, and to release air and return to its unactuated position by spring action when air pressure is turned off. Arm 110 contacts switch means 112 and 113 near its upward and downward limits of travel, respectively. A handle 114 rigidly supported on an arm 115 enables the operator to guide the stylus along groove 104.

Arms 109, 116, 117 and 118 form a pantograph for motionally connecting stylus 106 to output end 119 of the pantograph. Arms 109, 116, 117 and 118 are preferably supported for low-friction, lash-free movement by means of preloaded ball bearings at pivot points 120, 121, 122, 123 and 124.

The output end 119 of the pantograph is pivotally attached at pivot point 124 to arm 125 which carries work piece supporting means such as plate 126. A work piece or work strip (here shown as work strip 127) may be supported on plate 126 for operation thereon by a tool. The tool in the illustrated embodiment comprises punch 128, which cooperates with die 129. The tool is provided with prime mover means for bringing it into contact with the work and performing its operation thereon; in this case the prime mover means includes press 130 and air cylinder 131.

There are provided means for moving work piece 127 in a path having the same configuration as groove 104 on template 103. In addition to the pantograph comprising arms 109, 116, 117 and 118, this means may include swinging arms 132, 133, 134, 135 and 136 which are supported from surface 101 at points 137 and 138, and are pivoted relative to each other at points 139 and 140. Arms 134 and 135 are pivoted to arm 125 at points 141 and 142, respectively. The pivot points for this swinging link arrangement are also preferably of a low-friction, lash-free nature, such as provided by preloaded ball bearings. Those skilled in the art can readily appreciate, of course, that other mechanical linkage arrangements are possible, and that electrical, hydraulic, or other non-mechanical linking means may be employed without departing from the spirit and scope of my invention.

Clamp means may be provided for securing the work piece to plate 126. These clamp means may comprise a lower arm 143 secured to the underside (not visible) of arm 125 and an upper arm 144 pivoted at point 145 to arm 143. A similar pair of arms 146 and 147 may also be provided to clamp the work piece.

Clamp actuating means are provided for moving arms 144 and 147 downward to secure the work. These clamp actuating means are preferably prime mover means such as air cylinders 148 and 149, which may be supplied with air through line 150, fittings 151 and 152 and line 153 from a source not illustrated because of its immaterial nature. The actuating cylinders 148 and 149 may be supported on bracket 154 attached at its bottom edge by any convenient means to the rear surface (not visible) of arm 125.

Consideration of Fig. 1 reveals that as the operator grasps handle 114 to move stylus 106 along groove 104, work strip 127 is moved between punch 128 and die 129 in the same relative path. As those skilled in mechanical arts can readily appreciate, the linkage may be designed with any desired ratio of motion of stylus 106 to work piece 127. We prefer that this ratio be 2:1 to minimize errors.

There are also provided switch means actuated when the tool has substantially completed an operation on the work piece. In the illustrated embodiment of our invention, punch 130 has an arm 155 to which is connected shaft 156. Collar 157 with arm 158 actuates switch means 159 as punch 128 descends into die 129.

Figure 2:
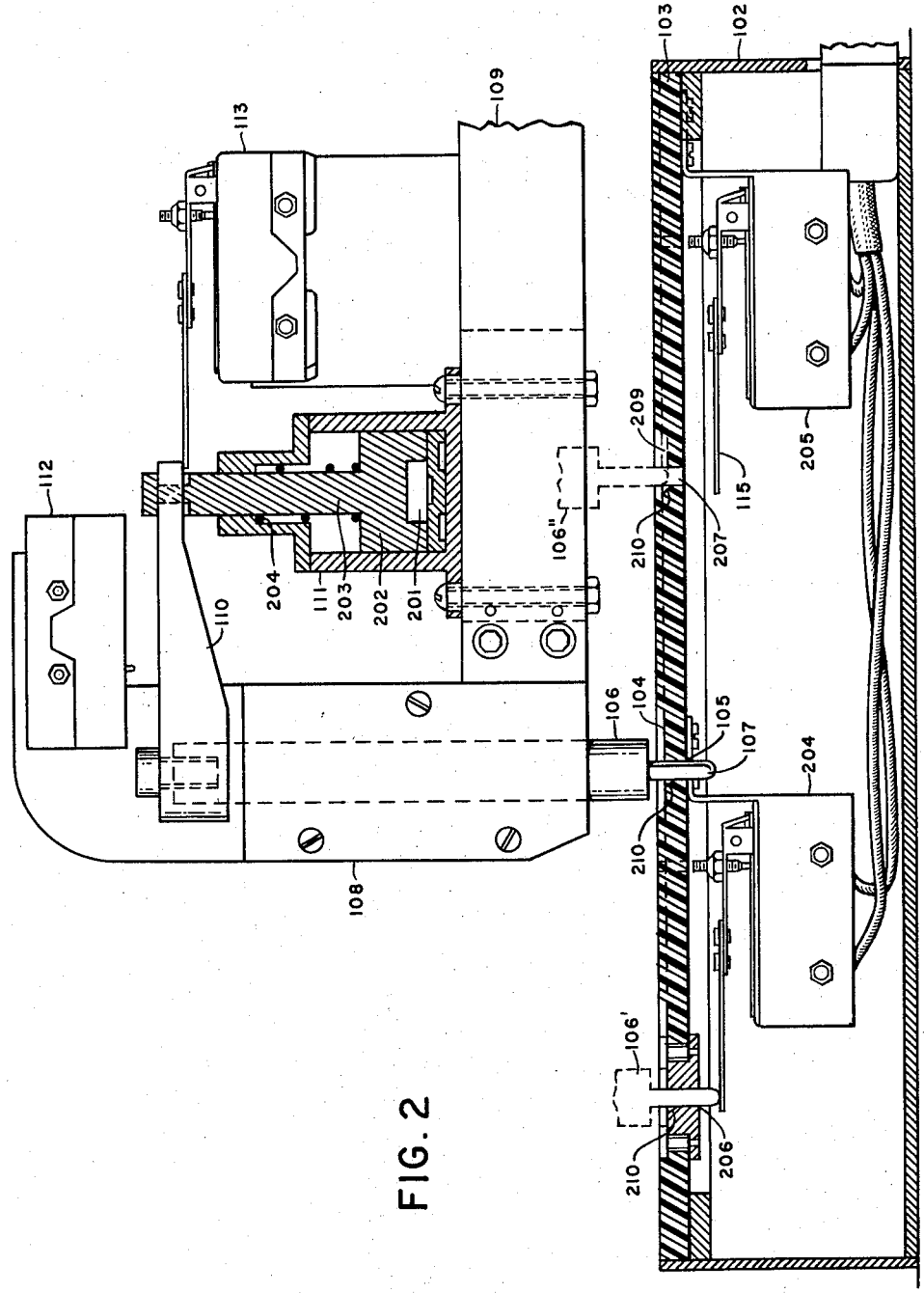
Fig. 2 is a semi-sectional view of the template and stylus assembly of the embodiment of Fig. 1.

Fig. 2 shows in greater detail the arrangement of the stylus arm and template. Cylinder 111 is shown sectioned in Fig. 2 to reveal air chamber 201, piston 202, actuating shaft 203, and a resilient means, such as spring 204, which biases piston 201 downward when no pressure is present on the opposite side thereof. While we prefer that cylinder 111 be air-actuated, those skilled in the art can readily appreciate that hydraulic, electromagnetic, or other means may be used in place of an air cylinder.

Fig. 2 also reveals the presence beneath template 103 of first and second switch means 204 and 205, respectively. Each of these switch means, which may conveniently be of the snap-spring type operating on small increments of travel (sometimes called "microswitches"), is arranged to be actuated when the stylus drops into holes 206 and 207, respectively. Hole 207 does not represent a work station on the work piece, but is an additional hole. We term hole 207 an index hole. We refer to hole 206 as the last hole, because the operator starts with the index hole and moves the stylus along the succession of holes in the groove until hole 206 is reached; this represents the last work station on the work piece, and the operator next moves the stylus directly back to the starting point, index hole 207, along portion 408 of the groove. We have indicated by 106' and 106" the locations of stylus 106 when at holes 206 and 207, respectively.

Also indicated in Fig. 2 is lever 209 to which air cylinder 111, when actuated, raises the lower end of portion 107 of stylus 106. This level, it will be noted, is lower than that of the bottom of groove 104. At level 209, switch means 112 is not operated but is actuated when stylus 106 is in the groove. Fig. 2 further shows that the holes in template 103 each have a ramp portion 210 which guide stylus portion 107 upward from level 209 to the bottom of groove 104 as portion 107 leaves each hole.

Figure 3:
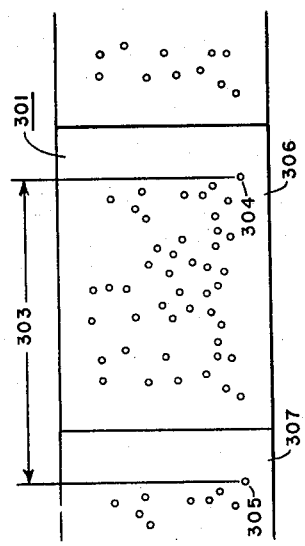
Fig. 3 is a top view of a typical work piece.

Fig. 3 shows a top view of a completed work strip typical of those producible on the illustrated embodiment of my invention. Those skilled in the art can readily appreciate that my invention is not limited to the use of work pieces mounted or formed in a work strip, as it is fully applicable to individual work pieces fed to the tool one at a time. The work piece or strip, as the case may be, comprises a plane sheet of material through which punch 128 and die 129 are required to perforate the hole indicated. Work pieces of this sort may be printed wiring boards in which perforations must be made to receive the leads of resistors, capacitors and other electrical components. The work pieces of the work strip indicated may be produced with the particular template (103) shown in Figs. 1 and 4. Hole 304 is the last hole or work station on work piece 306, and corresponds in position to the last hole 206 in the template. There is no hole in any work piece corresponding to index hole 207 in the template.

Figure 4:
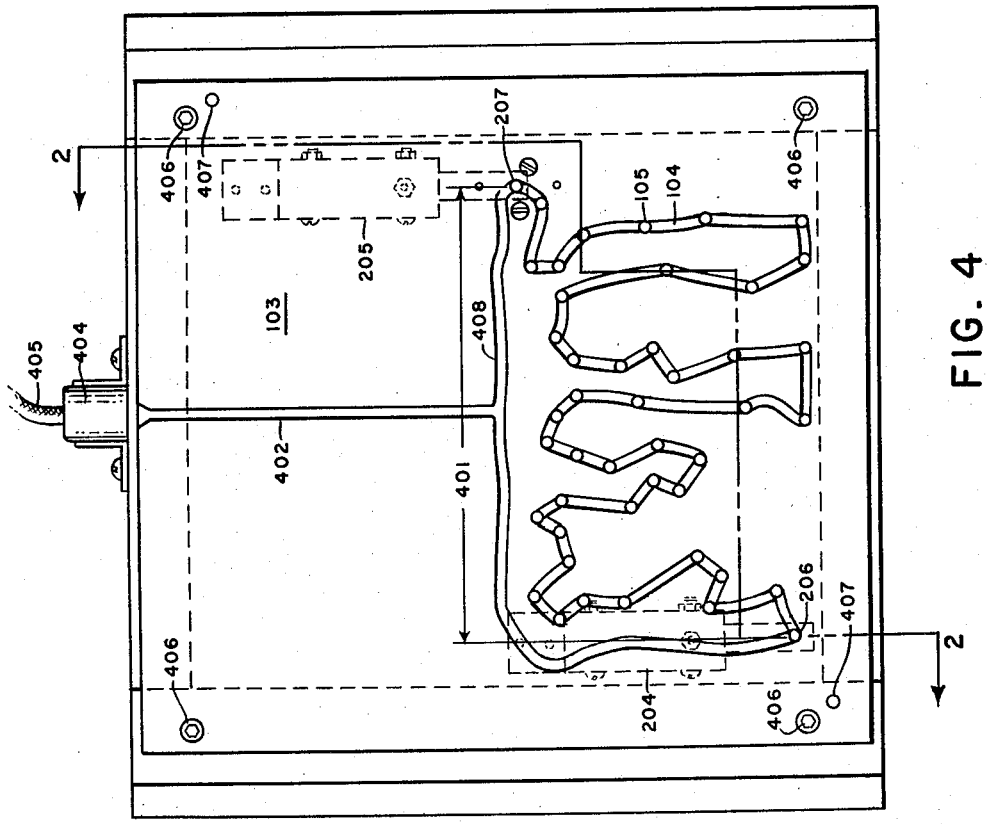
Fig. 4 is a top view of a template suitable for producing the work piece shown in Fig. 3.

Fig. 4 shows the construction of template 103 in greater detail than could be presented in Fig. 1. Groove 104 is continuous and is formed in the upper surface of template 103. A plurality of holes, such as 105, extend through template 103, and are distributed in succession along groove 104. Last hole 206 in the successive distribution following index hole 207 is spaced from the index hole by a distance 401 corresponding to the distance 303 between the last holes 304 and 305 of adjacent work pieces 306 and 307 in work strip 301.

There is shown in Fig. 5 a portion of the apparatus of Fig. 1 viewed from the left side. Visible in this drawing is switch means 501 supported above surface 101 by bracket 502. Switch means 501 is arranged to be actuated by end 503 of clamp arm 147.

We may prefer to employ automatic positioning means for work strips such as 127. Stops 504 may be arranged to rise in the path of a fresh work strip after the preceding work strip is completed. Stop 504 drops below the work piece level when the first work piece in the work strip is completed. The preferred mechanism for accomplishing this result comprises ratchet wheel 505, cam 506, pawl 507 and springs 508 and 509. Pawl 507 is urged into contact with the teeth of ratchet 505 by means of spring 509. Spring 508 keeps the ratchet wheel from reversing its direction when arm 147 returns to its clamp position.

Figure 6:
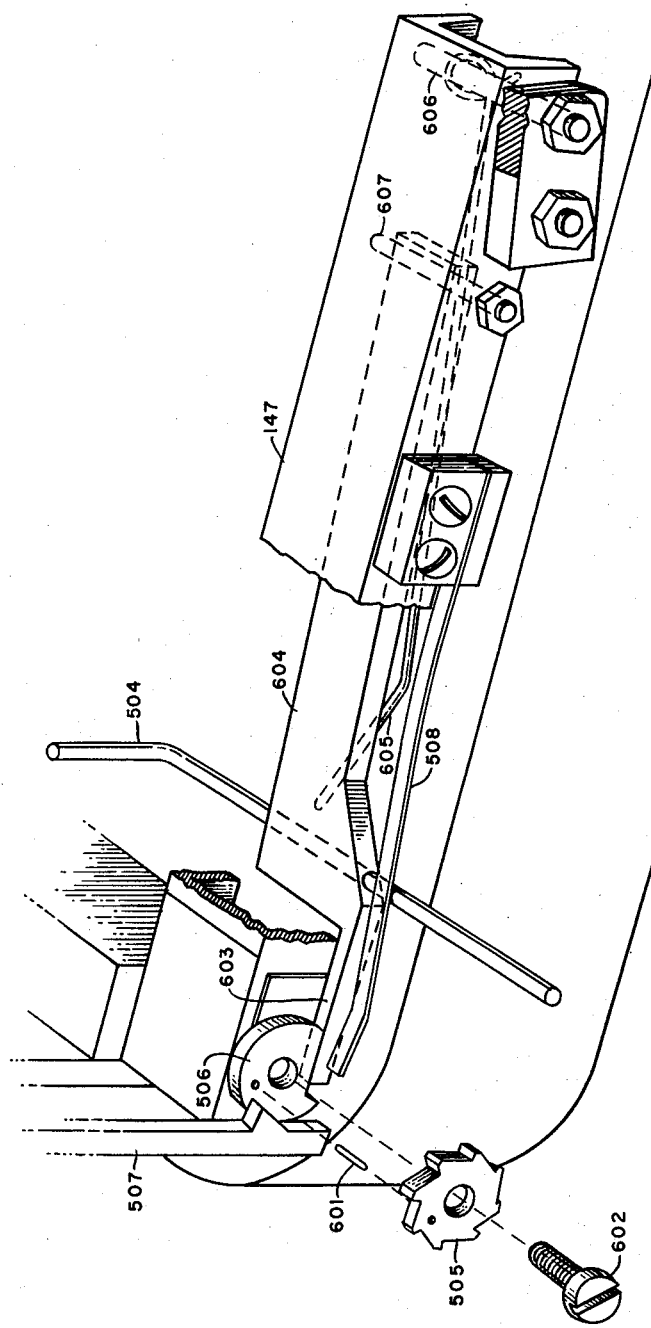
Fig. 6 is an isometric detail of a portion of the apparatus shown in Fig. 5.

The arrangement of parts 504 through 509 may be better understood from an examination of Fig. 6, which is a cut-away view of arm 147. It may there be seen that ratchet wheel 505 and cam 506 are secured together for unitary rotation by means of pin 601 and are pivoted about screw 602. The main face of cam 506 bears on portion 603 of bar 604. Stop member 504 may be slidably position in bar 604. Bar 604 is urged upward by means of spring 605, which is coiled around pivot member 606. Bar 604 is supported about pivot member 607.

The work strip positioning means is shown in Figs. 5 and 6 in the starting position, that is, with bar 604 in its uppermost position, and stop member 504 consequently projecting above the level of work strip 127. Each time arm 147 rises in synchronism with arm 144 to release the clamps from work strip 127, pawl 507 rises and therefore rotates artchet wheel 505 one tooth. Cam 506 rotates and causes stop 504 to descend as soon as the clamps rise at the end of the first work piece. Ratchet wheel 505 may have as many teeth as there are work pieces in the work strip so that when the last work piece in the work strip is finished, ratchet wheel 505 has rotated by the amount necessary to allow end 603 of bar 604 to rise against cam 506 and hence bring stop 504 into its uppermost position. Again, those skilled in the art can readily appreciate that automatic stop-raising means are not essential to the operation of my invention, and furthermore, that various other stop-setting means are possible.

There is shown in Fig. 7 a schematic wiring diagram of the control apparatus we prefer to employ for the illustrated embodiment of our invention. On the left is master on-off switch 700 having contacts 701 and 702. Also on the left are contacts 703, 704, 705, 708 and 709 corresponding respectively to switches 113, 205, 204, 159 and 112 shown in preceding figures. Contacts 706 and 707 are in turn associated with switch 501.

In the central portion of Fig. 7 are shown the relays and associated wiring which we prefer to employ in the illustrated embodiment of our invention, and to the right are shown solenoids or other control means for the air cylinders. Solenoid 710 controls the admission of air to cylinder 111, solenoid 711 that of cylinders 148 and 149 in parallel, and solenoid 712 to prime mover cylinder 131. Except for the switch means already shown in the drawings, we have not indicated the physical appearance of the remaining apparatus of Fig. 7 because neithesr appearance nor location is germane to our invention.

To place the illustrated apparatus in operation, the operator places a fresh work strip on support means 126 with its leading edge against stop 504. If stop 504 is not in its uppermost position, spring 508 may be depressed and ratchet wheel 505 rotated by hand until stop 504 rises. Next, the operator brings stylus 106 near index hole 207 and places on-off switch 700 in its On position.

The latter action establishes a circuit for relay 750 from (+), winding of relay 750, contacts 731, and contacts 701 of on-off switch 700 to ground. Operation of relay 750 establishes a circuit from x, winding of solenoid 710 and contacts 752 to y. Solenoid 710 thereupon operates and admits air to cylinder 111, whereupon the piston of cylinder 111 raises stylus 106 to level 209. Actuation of relay 750 also causes the operation of relay 730 over a circuit extending from (+), winding of relay 730, contacts 754 and contacts 701 to ground. Since stylus portion 107 is in groove 104 at this time, switch means 112 is actuated. Consequently contacts 709 are open and relay 750 cannot lock through them.

Relay 730 now locks itself operated over a circuit extending from (+), winding of relay 730, contacts 732 and contacts 701 to ground. The operation of relay 730 also causes solenoid 711 to be energized over a circuit extending from x, winding of solenoid 711, contacts 743, contacts 702, and contacts 733 to y. The operation of solenoid 711 causes admission of air to air cylinders 148 and 149 in parallel, causing clamp arms 144 and 147 to descend and clamp work piece 127 securely to work piece supporting means 126. The descent of the clamp arms causes the operation of switch means 501, but the latter action produces no effect at this time.

The operation of relay 730 breaks the operating circuit for relay 750 at contacts 731, and relay 750 is consequently released. The release of relay 750 causes the de-energization of solenoid 710 by opening contacts 752. With the removal of air pressure from air cylinder 111, stylus 106 is free to drop into index hole 207. This action causes the operation of switch means 703 and 704, but these produce no action at this time.

As the operator continues pressure on handle 114 to urge stylus 106 along groove 104, stylus portion 107 rides up ramp 210 on hole 207 to rise from level 209 to the bottom of groove 104, and thereby to actuate switch means 112. Contacts 709 thus opened, but there is no effect at this time. As stylus 106 is moved along groove 104, therefore, it is ready to drop into the first other hole in the distribution of holes following the index hole.

When stylus portion 107 descends into the first other hole in the succession of holes in groove 104, switch means 113 is actuated, thereby closing contacts 703. This establishes a circuit for relay 760 extending from (+), winding of relay 760, contacts 703, contacts 704, and contacts 701 to ground. Relays 760 in turn energizes solenoid 712 from a circuit extending from x, winding 712, and contacts 761 to y. Solenoid 712 causes the admission of air to cylinder 131, thereby causing punch 128 to descend, pierce work strip 127 in the appropriate place, and pass into die 129.

The descent of punch 128 closes contacts 708 in switch means 159 to close another circuit for operating relay 750. This circuit may be traced from (+), winding 750, contacts 742, contacts 707, contacts 708 and contacts 701 to ground. Relay 750 recloses the circuit for solenoid 710 at contacts 752 to re-energize air cylinder 111 and cause stylus portion 107 to be withdrawn from the hole in the template. Relay 750 locks over a circuit extending from (+), contacts 753, contacts 709, and contacts 701 to ground. This keeps contacts 752 closed to maintain solenoid 710 energized and air pressure on cylinder 111. Air pressure in cylinder 111 raises stylus portion 107 to level 209, and the operator is therefore free to move handle 114.

As stylus 106 is moved away from the hole, stylus portion 107 strikes ramp portion 210 and is thereby raised from level 209 to the bottom of groove 104. Switch means 112 is consequently actuated and contacts 709 are opened to release the locking circuit for relay 750. The release of relay 750 breaks contacts 752, which in turn de-energizes solenoid 710 to release air from cylinder 111. Stylus portion 107 is then urged downward to the bottom of groove 104 through the action of spring 204 in cylinder 111. Under these circumstances, stylus 107 may be moved along groove 104 under the action of the operator's hand on handle 114, ready to drop into the next hole in the succession of holes in template 104. The action outlined in connection with the first other hole in the distribution of holes along groove 104 is therefore repeated for each of the other holes in sequence, until last hole 206 is reached.

When stylus portion 107 drops into last hole 206, switch means 204 is thereby actuated. This closes contacts 705 to establish an operating circuit for relay 720 extending from (+), winding of 720, contacts 705, and contacts 701 to ground. As in the case of the preceding holes, closure of contacts 703 operates relay 760 which in turn closes contacts 761 to energize solenoid 712, thereby causing admission of air to cylinder 131. Punch 128 consequently pierces the last hole in the work piece. The closure of relay 720, however, causes the upper winding 770a of relay 770 to be energized over a circuit extending from (+), winding 770a, contacts 721, contacts 723, contacts 705, and contacts 701 to ground. Relay 770 then operates and establishes a locking circuit for solenoid 712 which extends from x, winding of 712, and contacts 771 to y.

Descent of the tool through the work piece operates switch means 159 to reclose contacts 708 and re-establish the operating circuit for relay 750 extending from (+), winding of relay 750, contacts 742, contacts 707, contacts 708, and contacts 701 to ground. Relay 750 now locks over a circuit extending from (+), winding 750, contacts 753, contacts 709, and contacts 701 to ground. At the same time, relay 715 energizes solenoid 710 over a circuit extending from x, winding of 710, and contacts 752 to y. This causes admission of air to cylinder 111, which in turn raises stylus 106 to level 209. At this time also, relay 715 closes an operating circuit for relay 740 extending from (+), winding 740, contacts 751, contacts 722, contacts 704, and contacts 701 to ground. Relay 740 in turn locks over a circuit extending from (+), winding 740, contacts 741, contacts 722, contacts 704, and contacts 701 to ground. In addition, relay 740 breaks the original operating circuit for relay 750 at contacts 742, and furthermore breaks the established operating circuit for solenoid 711 at contacts 743. At this time, air is released from air cylinders 148 and 149 to allow clamp members 144 and 147 to rise and unclamp the work strip 127. It will be noted, however, that punch 128 remains down in the work strip, so that the work strip is held stationary relative to the tool despite being unclamped. As clamp 147 rises, switch means 105 is returned to its inactivated position, thereby establishing a second hold circuit for relay 770 extending from (+), winding 770b, contacts 706, contacts 708, and contacts 701 to ground.

Next, the operator moves handle 114, thereby causing stylus portion 107 to rise along ramp 210 of the last hole 206 from level 209 to that of the bottom of groove 104. This breaks the hold circuit for relay 750 at contacts 709, and relay 750 consequently breaks the energizing circuit for solenoid 710 at contacts 752. The resultant release of air from cylinder 111 again places stylus 106 under the pressure of spring 204, and is consequently in readiness to drop into index hole 207 as the operator completes the movement of stylus portion 107 along groove portion 208.

As the stylus is moved from last hole 206 to index hole 207, work piece support means 126 is moved under the stationary work strip by an amount corresponding to the distance between the corresponding last holes in adjacent work pieces in the work strip. When stylus portion 107 again drops into index hole 207, switch means 205 is operated to open contacts 704 and thereby break the hold circuit for relay 720, the hold circuit for relay 740, the operating circuit for relay 760, and the operating circuit for the upper winding 770a of relay 770. Tool 128 remains in its lowermost position, however, because it is still held from relay 770 through energization of winding 770b, which holds contacts 771 closed to continue energization of solenoid 712 and the consequent continued application of air pressure to air cylinder 131.

The release of relay 740 causes contacts 743 to be remade and consequently to recomplete the circuit for solenoid 711 over a circuit extending from x, contacts 743, contacts 702 and contacts 733 to y. As a result, air is re-admitted to cylinders 148 and 149 which in turn cause clamp bars 144 and 147 to descend and clamp work piece 127 to work piece supporting means 126. This action recloses contacts 707 of switch means 501 to re-establish a circuit for relay 750 extending from (+), winding 750, contacts 742, contacts 701, contacts 708 and contacts 701 to ground. Relay 750 relocks over a circuit extending from (+), winding 750, contacts 753, contacts 709, contacts 701 to ground. Relay 750 also re-energizes solenoid 710 at contacts 752 to readmit air to cylinder 111 and cause stylus 106 to be raised to level 209. When the switch means 501 is actuated through descent of clamp bar 147, contacts 706 are broken to de-energize winding 770b, thereby releasing contacts 771 to de-energize solenoid 712 and remove air pressure from air cylinder 131. Cylinder 131 is thereby allowed to rise under spring pressure away from work strip 127. At this point, the illustrated equipment is ready to repeat the sequence of events outlined previously in connection with index hole 207.

Each of the work pieces in the work strip is perforated one hole at a time, until all work pieces in the work strip are completed. At this time, switch 700 may be placed in the "off" position, thereby opening the hold circuit for relay 730 at contacts 701 and causing return of the equipment to its initial state. Groove 402 may be provided to permit the stylus to be moved away from the template in order that templates may readily be changed. We prefer that template 103 be secured to mounting base 102 in such fashion that this may be quickly accomplished, such as by dowels 406, for rapidly and accurately positioning template 103 with respect to base 102 and screws 407 to secure the templates in registry with said dowels. We also prefer to provide a plug-in arrangement including plug 404 and cable 405.

While we have shown and described our invention as applied to a specific embodiment thereof, other modifications will readily occur to those skilled in the art. We do not, therefore, desire our invention to be limited to the specific arrangement shown and described, and we intend in the appended claims to cover all modifications within the spirit and scope of our invention.

What is claimed is:

1. In a template-guided machine tool adapted to perform an operation at various work stations on a work piece, the combination of a tool; means for positioning said work piece and said tool relative to each other for said tool to work on said piece, a stationary template having a plurality of stations thereon respectively corresponding to said work stations on said work piece; a stylus adapted to be moved about said template from station to station; means linking said stylus to said positioning means for movement therewith; means for causing said tool to advance from a rest position into contact with said work piece to perform said operation thereon when said stylus reaches each said station on said template; and interlocking means independent of said linking means for preventing movement of said stylus from any said station on said template during the time said tool is in said advanced work piece contacting position, said interlocking means being responsive to the retraction of said tool to said rest position for releasing said stylus to permit its manual movement by the operator to the next station on said template.

2. In a template-guided machine tool adapted to perform an operation at various work stations on a work piece, the combination of a tool; means for movably supporting said work piece relative to said tool for work by said tool on said work piece; a template having a continuous shallow groove formed in the surface thereof and a plurality of holes successively distributed along said groove, each said hole corresponding to respective ones of said work stations on said work piece; a stylus supported for movement in and along said groove, said stylus having a portion proportioned to ride in said groove and to fit into each of said holes; means linking said stylus to said work piece supporting means for movement therewith; means for causing said tool to advance from a rest position into contact with said work piece to perform said operation thereon when said stylus portion rests in one of said holes; means for withdrawing said stylus portion from each said hole; and interlocking means independent of said linking means preventing the operation of said last-named means during the time said tool is in said advanced work piece contacting position, said interlocking means being responsive to the retraction of said tool to said rest position for allowing said withdrawing means to operate to thereby remove said stylus from the template hole and permit the manual movement of the stylus by the operator to the next station on said template.

3. In a template-guided machine tool adapted to perform an operation at various work stations on a work piece, the combination of a tool; means for supporting said work piece for work by said tool on said work piece; said supporting means being movable in a plane relative to said tool; a template supported in a plane parallel to said plane of said work piece supporting means; said template having a continuous groove formed in the surface thereof and having a plurality of holes successively distributed along said groove, each said hole corresponding to respective ones of said work stations on said work piece; a stylus having a portion proportioned to fit into said groove and said holes; means for supporting said stylus for movement with said portion of said stylus riding in said groove; said stylus being arranged for movement relative to said stylus support means substantially at right angles to said plane of said template; resilient means urging said portion of said stylus into said groove, said resilient means also urging said portion into any one of said holes along said groove; means linking said stylus to said work piece supporting means for substantially planar movement therewith; means responsive to movement of said portion of said stylus into one of said holes for causing said tool to advance from a rest position into contact with said work piece to perform said operation thereon; means for retracting said stylus from said hole and interlocking means independent of said linking means for preventing the operation of said retracting means, said interlocking means being responsive to the retraction of said tool to said rest position for allowing said retracting means to operate thereby permitting the manual movement of said stylus by the operator to the next station on said template.

4. The combination of claim 3 in which said groove is provided with a ramp portion adjacent each of said holes and means is provided for inactivating said retracting means in response to planar movement of said stylus portion against said ramp portion, whereby said stylus is thereupon urged toward said groove by said resilient means.

5. In a template-guided machine tool adapted to perform an operation at various work stations on each of a plurality of work pieces contained in a work strip, the combination of a tool; means for supporting said work strip for work by said tool on said strip, said supporting means being movable in a plane relative to said tool; a template supported in a plane substantially parallel to said plane of said work strip supporting means; said template having a continuous groove formed in the surface thereof and having an index hole and a plurality of other holes successively distributed along said groove, each of said other holes corresponding to a respective one of said work stations on said work pieces in said work strip; a last one of said other holes in said successive distribution following said index hole being spaced from said index hole by a distance corresponding to the distance between the corresponding last holes in adjacent said work pieces in said work strip; a stylus having a portion proportioned to fit into said groove and said holes; means for supporting said stylus for movement with said portion of said stylus riding in said groove; said stylus being arranged for movement relative to said stylus supporting means substantially at right angles to said plane of said template; resilient means urging said portion of said stylus to enter any one of said holes when poised thereover; means linking said stylus to said work piece supporting means for planar movement therewith; means responsive to movement of said portion of said stylus into one of said holes for causing said tool to advance into contact with said work piece to perform said operation thereon; means responsive to the completion of said operation by said tool for retracting said stylus from said hole; means responsive to the entrance of said stylus portion into said index hole for clamping said work strip to said work strip supporting means; and means responsive to the entrance of said stylus portion into said last hole in said template for releasing said work strip clamping means and withdrawing said stylus from said last hole, all while maintaining said tool substantially in its most advanced position relative to said work strip, whereby said stylus may be moved from said last hole in said template directly along said groove to said index hole, thus moving said work strip supporting means while said tool holds said work strip stationary, in order to bring the next succeeding work piece of said work strip into working position relative to said tool as said stylus is moved to said index hole.

6. In a template-guided machine tool adapted to perform an operation at various work stations on a work piece, the combination of a tool; means for supporting said work piece relative to said tool for work by said tool on said work piece; a template having a plurality of stations thereon respectively corresponding to said work stations on said work piece; a stylus adapted to be moved about said template from station to station; means linking said stylus to said work piece supporting means for movement therewith; prime mover means for advancing said tool into contact with said work piece to perform said operation thereon; electrical control means for said prime mover means; switch means for governing said electrical control means; said switch means being actuated by the arrival of said stylus at one of said stations on said template, thereby causing said electrical control means to activate said prime mover means to advance said tool into contact with said work piece; means for retracting said stylus from said station on said template; electrical control means for said retracting means; and switch means actuated upon the substantial performance of said operation by said tool on said work piece for causing said electrical control means for said retracting means to activate said retracting means to retract said stylus from said station on said template.

7. In a template-guided machine tool adapted to perform an operation at various work stations on each of the plurality of work pieces contained in a work strip, the combination of a tool; means for supporting said work strip for work by said tool on said work piece, said supporting means being movable in a plane relative to said tool; a template supported in a plane parallel to said plane of said work strip supporting means, said template having a continuous groove formed in the surface thereof and having an index hole and a plurality of other holes successively distributed along said groove, each of the other holes corresponding to a respective one of said work stations on said work pieces in said work strip; a last one of said other holes in said successive distribution following said index hole being spaced from said index hole by a distance corresponding to the distance between the corresponding last holes in adjacent said work pieces in said work strip; said groove having a ramp portion adjacent each of said holes; a stylus having a portion proportioned to fit into said groove and said holes; means for supporting said stylus for movement with said portion of said stylus riding in said groove, said stylus being arranged for movement relative to said stylus supporting means substantially at right angles to said plane of said template; resilient means urging said portion of said stylus to enter any one of said holes when poised thereover; means linking said stylus to said work piece supporting means for planar movement therewith; prime mover means for advancing said tool into contact with said work piece to perform said operation thereon; electrical control means for said prime mover means; switch means connected to said electrical control means, said switch means being actuated by entrance of said portion of said stylus into any one of said other holes to cause said prime mover to advance said tool towards said work piece when said stylus enters a said other hole; means for retracting said stylus from any said hole in said template against the force of said resilient means; electrical control means for said retracting means; a circuit for said electrical control means for said retracting means; switch means connected in said circuit; means for causing said last-named switch means to break said circuit when said tool is substantially in position corresponding to completion of said operation, whereby said stylus is retracted from said template when said operation is substantially complete at each said station; additional switch means in said circuit; means for causing said additional switch means to break said circuit as said stylus portion rides up said ramp portion adjacent any said hole, whereby said retracting means is inactivated after said stylus portion leaves any one of said holes and said stylus is thereupon urged against said groove by said resilient means.

8. The combination of claim 7 in which are provided a clamp for securing said work strip to said work strip supporting means; means for actuating said clamp; electrical control means for said clamp actuating means; a circuit for said clamp control means, first switch means operationally connected in said circuit for said clamp control means and actuated by entry of said stylus portion into said index hole for closing said circuit and thus causing said clamp to secure said work strip to said work strip supporting means; and second switch means also operationally connected in said clamp control means circuit but actuated by entry of said stylus portion into said last hole in said template to break said clamp control means circuit and said circuit for said prime mover means for advancement of said tool, all while maintaining said tool in its most advanced position, whereby said stylus may be moved from said last hole in said template directly along said groove to said index hole, thus moving said work strip supporting means while said tool holds said work strip stationary, in order to bring the next succeeding work piece of said work strip into working position relative to said tool as said stylus is moved to said index hole.

References Cited in the file of this patent

UNITED STATES PATENTS

| | | |
|---|---|---|
| 934,672 | Kilgore | Sept. 21, 1909 |
| 1,310,034 | Powers | July 15, 1919 |
| 2,684,717 | Jones | July 27, 1954 |
| 2,701,017 | Wiedemann | Feb. 1, 1955 |
| 2,733,642 | Beatty et al. | Feb. 7, 1956 |